United States Patent [19]

Vedder et al.

[11] Patent Number: 5,012,464

[45] Date of Patent: Apr. 30, 1991

[54] COMPUTER-CONTROLLED LASER IMAGING SYSTEM WITH AUTOMATIC BEAM START AT LINE BEGINNING

[75] Inventors: Hans J. Vedder, Puchheim; Hans Krenn, Grasbrunn, both of Fed. Rep. of Germany

[73] Assignee: AGFA-Gevaert AG, Leverkusen, Fed. Rep. of Germany

[21] Appl. No.: 320,778

[22] Filed: Mar. 8, 1989

[30] Foreign Application Priority Data

Mar. 9, 1988 [DE] Fed. Rep. of Germany ....... 3807659

[51] Int. Cl.$^5$ ...................... G11B 7/085; G11B 7/125
[52] U.S. Cl. ................................. 369/116; 346/76 L; 346/135.1; 369/112; 358/475
[58] Field of Search .......................... 346/76 L, 135.1; 360/79; 369/112, 116, 117, 118, 119, 121; 358/471, 474, 475

[56] References Cited

U.S. PATENT DOCUMENTS 4,054,928 10/1977 Butler et al. ......................... 360/79

Primary Examiner—Robert L. Richardson
Attorney, Agent, or Firm—Michael J. Striker

[57] ABSTRACT

A computer-controlled laser imaging system for switching on a laser imaging beam at the beginning of a line of an image surface has a laser and lens for emitting a laser-light beam, an acoustic/optical modulator for receiving and modulating the beam into a primary beam of first-order diffraction corresponding to the desired image and for separating in a y-direction transverse to the x-direction from the laser-light beam an unmodulated $0^{th}$-order secondary beam for use in determining line start, and a first telescopic lens system and a rotary polygonal mirror for deflecting the modulated beam in the x-direction of the line to be written. The secondary beam is focussed through the first lens system on the mirror in registration with the primary modulated beam so that the primary and secondary beams cross on the mirror. A second telescopic lens system and a projecting lens receive the deflected main beam and cast it on the image surface. A photodetector in the second lens system is positioned in the secondary beam and is also positioned to intercept the primary beam generally at the beginning of a line. An electronic circuit is connected between the photodetector and the modulator for initiating modulation when the photodetector is impinged by the beams.

7 Claims, 1 Drawing Sheet

COMPUTER-CONTROLLED LASER IMAGING SYSTEM WITH AUTOMATIC BEAM START AT LINE BEGINNING

FIELD OF THE INVENTION

The present invention relates to computer-controlled laser imaging system. More particularly this invention concerns such a system set up to automatically start the laser beam at the beginning of a line of an image-receiving surface.

BACKGROUND OF THE INVENTION

A standard computer-controlled laser imaging system has a laser and lens for emitting a laser-light beam and an acoustic/optical modulator for receiving and modulating the beam into a beam of first-order diffraction corresponding to the desired image. A first telescopic lens system and a rotary polygonal mirror deflect the modulated beam in the x-direction of, that is parallel to, the line to be written and a second telescopic lens system and a projecting lens receive the deflected main beam and cast same on the image surface.

In such arrangements is standard to deflect in the y-direction perpendicular to the x-direction, which is parallel to the line or row being printed, by means of an oscillating mirror, as opposed to the rotary polygonal mirror used for deflection in the x-direction. As a result the start of actual writing must be accurately established. The most modern system operates in that when the main laser is off an auxiliary laser directs a beam through the first optical system to the polygonal mirror. The secondary-laser beam scans over a plate with an optical raster whose lines run in the vertical y-direction. The intensity modulation created by these lines is detected by a photodetector lying outside the path of the main imaging beam. This photodetector is set up such that the polygonal beam is in just the right position for deflecting the imaging beam at the start of a line on the image surface when the auxiliary laser beam is detected by the photodetector, and then the start signal for the imaging laser beam is emitted. If necessary a time delay can be imposed between the photodetector and the starting circuit for the imaging laser beam. The provision of the second laser and the raster plate makes this system fairly complex and expensive.

In U.S. Pat. No. 4,337,994 a system is described wherein instead of a polygonal mirror use is made of a so-called hologon disk. A mirror is arranged at a position along the main imaging beam downstream of the hologon disk to intercept this beam when it is not on the image surface. A photodetector is associated with this mirror which responds to the beam when it is intercepted and is connected to circuitry to cut off the laser beam when this happens. A time circuit turns the laser beam on again after an interval corresponding to its return to the imaging surface. Such an arrangement is not usable for laser imaging systems which are provided with a polygonal mirror because errors created by the unavoidable imperfections of the mirror surface cannot be compensated for.

OBJECTS OF THE INVENTION

It is therefore an object of the present invention to provide an improved laser imaging system.

Another object is the provision of such an improved laser imaging system which overcomes the above-given disadvantages, that is which has automatic beam start at the beginning of a line and that is nonetheless of simple and inexpensive construction.

SUMMARY OF THE INVENTION

According to this invention a computer-controlled laser imaging system for switching on a laser imaging beam at the beginning of a line of an image surface has a laser and lens for emitting a laser-light beam, an acoustic/optical modulator for receiving and modulating the beam into a primary beam of first-order diffraction correspondig to the desired image and for separating in a y-direction transverse to the x-direction from the laser-light beam an unmodulated $0^{th}$-order secondary beam for use in determining line start, and a first telescopic lens system and a rotary polygonal mirror for deflecting the modulated beam in the x-direction of the line to be written. The secondary beam is focussed through the first lens system on the mirror in registration with the primary modulated beam so that the primary and secondary beams cross on the mirror. A second telescopic lens system and a projecting lens receive the deflected main beam and cast it on the image surface. A photodetector in the second lens system is positioned in the secondary beam and is also positioned to intercept the primary beam generally at the beginning of a line. An electronic circuit is connected between the photodetector and the modulator for initiating modulation when the photodetector is impinged by the beams.

Thus with this system there is only a single laser, but still the line-start is automatically detected and the laser is automatically turned on and off to write the lines of the image.

DESCRIPTION OF THE DRAWING

The above and other objects, features, and advantages will become more readily apparent from the following, reference being made to the accompanying drawing whose sole FIGURE is a schematic diagram of the system according to this invention.

SPECIFIC DESCRIPTION

Figure 1:
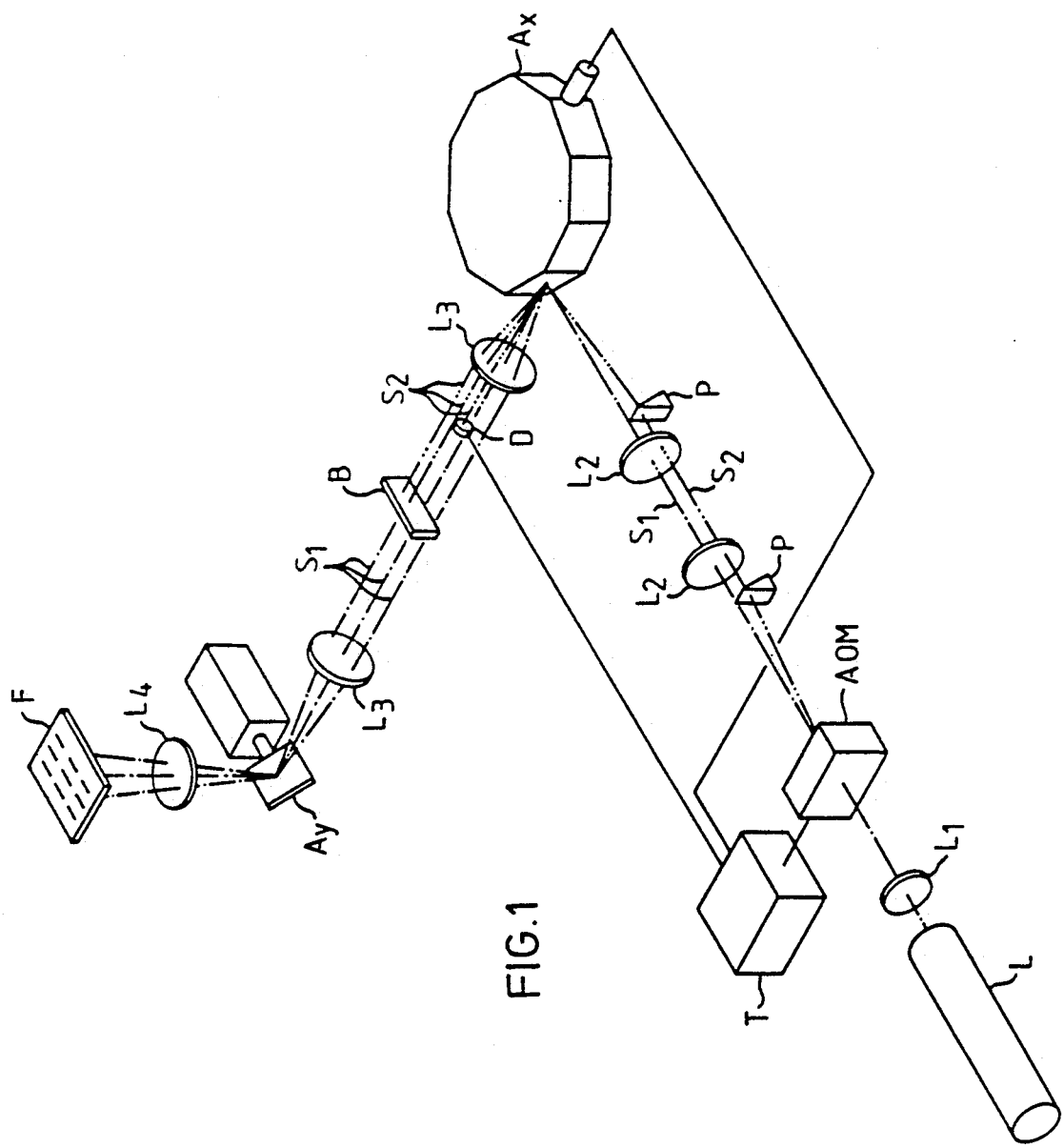

As seen in the drawing a beam emitted by a gas or solid-type laser L is focused by a lens $L_1$ on an acoustic/optical modulator AOM. A high-frequency voltage applied to the modulator crystal creates in this crystal an ultrasonic vibration which in turn produces a periodic variation in the refractive index, like a phase grating. This effect deflects a portion of the incident laser beam from its original propagation direction. When the applied high frequency is modulated at the rate of the data being transferred, the deflection effect corresponds with the data rate. When the downstream optics use only this deflected portion of the light entering the modulator AOM, the so-called first-order part, to write, a beam $S_1$ is obtained whose intensity is modulated with the data rate. The increasing time of the laser-beam pulse produced by the intensity modulation is proportional to the size of the laser-beam diameter in the modulator crystal, so that as a rule it is necessary to focus in the modulator AOM by means of the lens $L_1$.

With the laser scanning according to the invention the modulated writing beam $S_1$ (the first deflected order of the crystal of the modulator AMO) as well as the unmodulated portion $S_2$ (the $0^{th}$ order of the crystal) are used. The deflection through the angle of a few mrad separates the beams $S_1$ and $S_2$ from each other. The unmodulated secondary beam $S_2$ is, unlike the actual writing beam, always on and is used to detect the start of a row. This procedure is advantageous when in limited-load use (because the beam must be fully used due to the sensitivity of the material on which the writing is being done) since it is not possible to split the laser output directly at the laser source. The splitting-off of the secondary beam downstream of the beam source leads in fact to a three-way subdivision with the otherwise occurring $0^{th}$ order being unused.

After leaving the modulator AOM the first order, of the laser beam $S_1$ that is to used for writing is spread by a telescope system $L_2$ and made parallel. The spreading serves to produce a laser-beam diameter from which later the desired spot diameter can be produced in the image plane.

The secondary beam $S_2$ also passes through a prism and mirror arrangement P and is focussed on the x-deflecting element, that is the polygonal mirror $A_x$, at the same location as the writing beam $S_1$. This serves to reduce any minor deflection-angle variations created between the writing and secondary beams $S_1$ and $S_2$ by irregularities in the surfaces of the polygonal facets of the mirror $A_x$. Then the secondary beam $S_2$ moves away as a results of its incidence angle in the y-plane.

Downstream of the polygonal mirror $A_x$ there is a second telescope system $L_3$, a so-called relay lens system, which serves to reform the incident beam $S_1$ on the scan element $A_x$ to a stationary point. This point is the focal point of the second lens of the second telescope system $L_3$. If necessary a y-deflecting element, here an oscillating mirror $A_y$ is in its focal plane. In addition the scan-angle load on the projecting lens $L_4$ an the input spot size on te first scan element $A_x$ can be maintained sufficiently small by appropriate choice of the diverging relationships of the relay lens system $L_3$. Thus the last optical element, after the optional second scan element, is the projecting lens $L_4$ which focuses the scanning input beam $S_1$ on the film plane F.

In a two-axis scanning system the x- as well as the y-deflection of the laser beams is effected by scan elements, that is it can be used with a stationary film. This is advantageous when working with small formats when the spot must be accurate to 1 micron to 2 microns and is much more convenient than moving the film in the y-direction, in particular when high speeds are needed.

In order to synchronize the start of writing with the start of a line in a two-dimensional imaging system with a stationary film it is impossible to put a photocell in the image plane, since the beam $S_1$ would then be deflected in the y-direction. Even when the beam is deflected only in the x-direction when used with microfilms there are substantial problems finding room for the mounting of a photocell because of the small size of the image, normally 7 mm by 5 mm.

In this case according to the illustrated embodiment the line-end signal is produced by first establishing the beginning of the line with a signal from a photodetector D which is placed in the image plane near the first relay lens $L_3$. To this end the writing and secondary beams $S_1$ and $S_2$ are separated after being reflected by the polygonal mirror $A_x$ at an angle from each other and are thereby vertically separated so that it is possible to find space for the photodetector D. Such positioning of the photodetector D in the image plane on the image side of the relay lens ensures that the secondary beam $S_2$ is always detected at the same angular position of the mirror $A_x$, regardless of the actual separation of the facets of the polygonal mirror $A_x$ from the relay lens, that is independently of the radial mirror swing and radial position of the point the beam impinges on the polygonal facets during mirror rotation. Since the position of the main beam $S_1$ on the film is only dependent in this relay-lens system on the angular position of the polygonal mirror $A_x$, writing always starts at the same horizontal position without needing additional electronic correction. The electronic elements create between the photodetector and the input of the modulator AOM a constant time delay T which is equal to the fixed interval between the detection of the secondary beam $S_2$ by the photodetector D and the desired start of writing of the beam $S_1$ on the film F. The delay is set in accordance with the selected actual physical position of the photodetector. When the secondary beam $S_2$ is always on and is not switched off after the start of a line by the modulator, it is necessary to provide next to the photodetector D above the writing beam $S_1$ a shutter B for the secondary beam $S_2$ so that this beam $S_2$ does not strike the film F when the mirrors $A_x$ and $A_y$ continue to turn.

The system according to this invention has the advantage that on the one hand no secondary laser is necessary and on the other hand in spite of use of an auxiliary beam $S_2$ for synchronizing the start of a line there is no weakening of the main writing beam $S_1$, because the secondary beam $S_2$ is separated out on modulation of the writing beam $S_1$.

What is claimed is:

1. A computer-controlled laser imaging system for switching on a laser imaging beam at the beginning of a line of an image surface, the system comprising:
   a laser and lens for emitting a laser-light beam;
   an acoustic/optical modulator for receiving and modulating the beam into a primary beam of first-order diffraction corresponding to the desired image and for separating in a y-direction transverse to the x-direction from the laser-light beam an unmodulated $0^{th}$-order secondary beam for use in determining line start;
   a first telescopic lens system and a rotary polygonal mirror for deflecting the modulated beam in the x-direction of the line to be written;
   means for receiving the secondary beam and focusing same through the first lens system on the mirror in registration with the primary modulated beam, whereby the primary and secondary beams cross on the mirror;
   a second telescopic lens system and a projecting lens for receiving the deflected main beam and casting same on the image surface;
   a photodetector in the second lens system positioned in the secondary beam and also positioned to intercept the primary beam generally at the beginning of a line; and
   circuit means connected between the photodetector and the modulator for initiating modulation when the photodetector is impinged by the beams.

2. The laser imaging system defined in claim 1 wherein the means for receiving and focusing the secondary beam includes at least one prism.

3. The laser imaging system defined in claim 1 wherein the photodetector is positioned such that it intercepts the main beam immediately before the start of a line, the circuit means including delay means for initiating modulation at an interval after intercepting the main beam corresponding to the time between when the main beam is intercepted by the photodetector and the line starts.

4. The laser imaging system defined in claim 1 wherein the second system has a first lens and the photodetector is in the focal plane of the first lens.

5. The laser imaging system defined in claim 1, further comprising
means including a second deflecting element for intercepting the beam from the second system and deflecting same in the y-direction perpendicular to the x-direction.

6. The laser imaging system defined in claim 1 wherein the circuit means cuts off the secondary beam after the start of the line.

7. The laser imaging system defined in claim 1, further comprising means including a shutter downstream of the polygonal mirror for cutting off the secondary beam after the start of the line being written.

* * * * *